United States Patent

Haydon

[15] 3,690,059
[45] Sept. 12, 1972

[54] CLOCK SYSTEM
[72] Inventor: Arthur W. Haydon, Middlebury, Conn.
[73] Assignee: Tri-Tech, Inc., Waterbury, Conn.
[22] Filed: Oct. 20, 1970
[21] Appl. No.: 82,405

Related U.S. Application Data

[63] Continuation-in-part of Ser. No. 866,322, Oct. 14, 1969, Pat. No. 3,643,420, and a continuation-in-part of Ser. No. 45,609, June 12, 1970.

[52] U.S. Cl. .....................................58/24 R, 58/25
[51] Int. Cl. .............................................G04c 13/02
[58] Field of Search...................58/23, 23 A, 24–26, 58/152 H; 310/164

[56] References Cited

UNITED STATES PATENTS

| 2,994,184 | 8/1961 | Stout | 58/24 R |
| 2,786,972 | 3/1967 | Dreier et al. | 58/35 W |

Primary Examiner—Richard B. Wilkinson
Assistant Examiner—Edith C. Simmons Jackmon
Attorney—Lee C. Robinson

[57] ABSTRACT

A clock for use either with an external source of alternating current of uniform frequency or an internal, auxiliary, rechargeable power source. The clock is normally synchronized with the uniform frequency of the alternating current and has a solid state oscillator circuit. A time indicating device is operated by a small synchronous motor requiring a minimal power input from the oscillator. During interruptions of power from the external source of alternating current the time indicator synchronous motor is driven at a reduced voltage supplied by the auxiliary power source. A calibrating circuit is provided to allow adjustment, comparison, and synchronization of the output of the oscillator with the frequency of the external alternating current source. In some embodiments a plurality of time indicating devices are operated simultaneously by the oscillator.

9 Claims, 4 Drawing Figures

TO OSCILLATOR CIRCUIT FIG. 3.

TO CALIBRATION CIRCUIT 142 OF FIG. 2

CLOCK SYSTEM

CROSS-REFERENCE TO RELATED APPLICATIONS

This application is a continuation-in-part of co-pending applications Ser. No. 866,322, filed Oct. 14, 1969, by Arthur W. Haydon, now U.S. Pat. No. 3,643,420 granted Feb. 22, 1972 and Ser. No. 45,609, filed June 12, 1970, by Arthur W. Haydon.

BACKGROUND OF THE INVENTION

This invention relates to clocks and clock systems whose time keeping ability is normally dependent upon the frequency of an alternating current source.

While of general application, the present invention is particularly well suited for use in time keeping systems including a master unit and one or more secondary units. The master unit, which may or may not incorporate visible time indicia, controls the operation of the various secondary units in the system. The master unit is normally powered by an external source of alternating current, such as the conventional utility line.

Most existing commercial clock systems of this type merely keep the master unit going during an interruption of power from the external source, without attempting to drive the secondary units. Upon the restoration of power, the secondary units are reset either manually or through the use of various reset mechanisms which increase the cost and actually decrease the reliability of the overall system because of added complexity.

One reason why such prior clock systems do not drive the secondary clocks during power interruptions is because the secondary clocks are operated by ordinary synchronous motors, commonly of either the reluctance or hysteresis type. Such motors have a relatively high power consumption for a standby power unit, such as a rechargable battery.

A typical synchronous secondary clock operated by a ordinary synchronous motor has a power consumption of approximately 2½ watts, and thus for a system of even 10 clocks the standby power supply would have to be capable of supplying 25 watts of power during the period of failure of the external source. This would require a sizable and expensive rechargable battery.

SUMMARY OF THE INVENTION

The present invention overcomes the foregoing and other disadvantages and achieves its primary object by the provision of a new and improved clock system in which the synchronous motors for the secondary units are maintained in continuous operation during an interruption of power from an external source.

In an illustrative embodiment of the invention, the clock system includes an electronic driver for producing output pulses of alternating polarity, and a circuit for synchronizing the frequency of the output signal of the driver with the frequency of the external alternating current signal. One or more time indicators, which may be either a master clock, secondary clocks or other time indicating devices, are driven by the driver output. Each time indicator includes a synchronous motor having a permanent magnet rotor for operating the time indicator.

In accordance with one feature of several advantageous embodiments of the invention, an auxiliary source of direct current powers the electronic driver and hence the time indicators during interruptions of the external alternating current signal in a manner such that the power supplied to the indicators is at a substantially reduced level and yet is sufficient to maintain the synchronous motors for the indicators in continuous operation. The auxiliary power source preferably includes a battery which is recharged by the external alternating current signal during periods of normal operation.

The time indicators illustratively are each driven by a small synchronous motor of the type disclosed in U.S. Pat. No. 3,495,113 issued to Arthur W. Haydon on Feb. 10, 1970. Such motors are more efficient than ordinary synchronous motors and normally only require 1 watt of alternating current to operate. Once started the motors continue to run on one-fourth watt, or even less during a power failure, because they may be driven at a reduced voltage during a current interruption. This minimizes the size of the auxiliary batteries required. In a ten clock system, for example, only 2½ watts of power is required. This is approximately the same power as was required to operate only a single ordinary synchronous clock motor.

With an external source signal of sixty cycles per second, for example, a solid state oscillator within the driver produces one hundred and twenty unipolar pulses per second to drive a "flip-flop". The flip-flop provides sixty alternate plus and minus pulses per second to power the motors of the time indicators. During normal operation, time intelligence is available from the external source of alternating current, and the oscillator is synchronized with this external source. During periods of power interruptions, however, the oscillator is free-running.

In accordance with another feature of the invention, in some embodiments, the frequency of the oscillator may be adjusted in a rapid and straight-forward manner for greater free-running accuracy. These embodiments include a calibrating lamp or other frequency comparing device which indicates any drift in frequency of the oscillator away from the frequency of the external alternating current source during normal operation. When a drift is detected, the oscillator frequency is adjusted to bring it back into correspondence with the frequency of the external source.

Where even greater accuracy is required during interruptions of power from the alternating current source, some embodiments include a standby power supply, frequency controlled by an electro-mechanical timing device having an internal physical timing standard.

The foregoing and other objectives, features, and advantages of the invention will be more readily understood upon consideration of the following detailed description of certain preferred embodiments of the invention, taken in conjunction with the accompanying drawings.

BRIEF DESCRIPTIONS OF THE DRAWINGS

DESCRIPTION OF PREFERRED EMBODIMENTS

Figure 1:
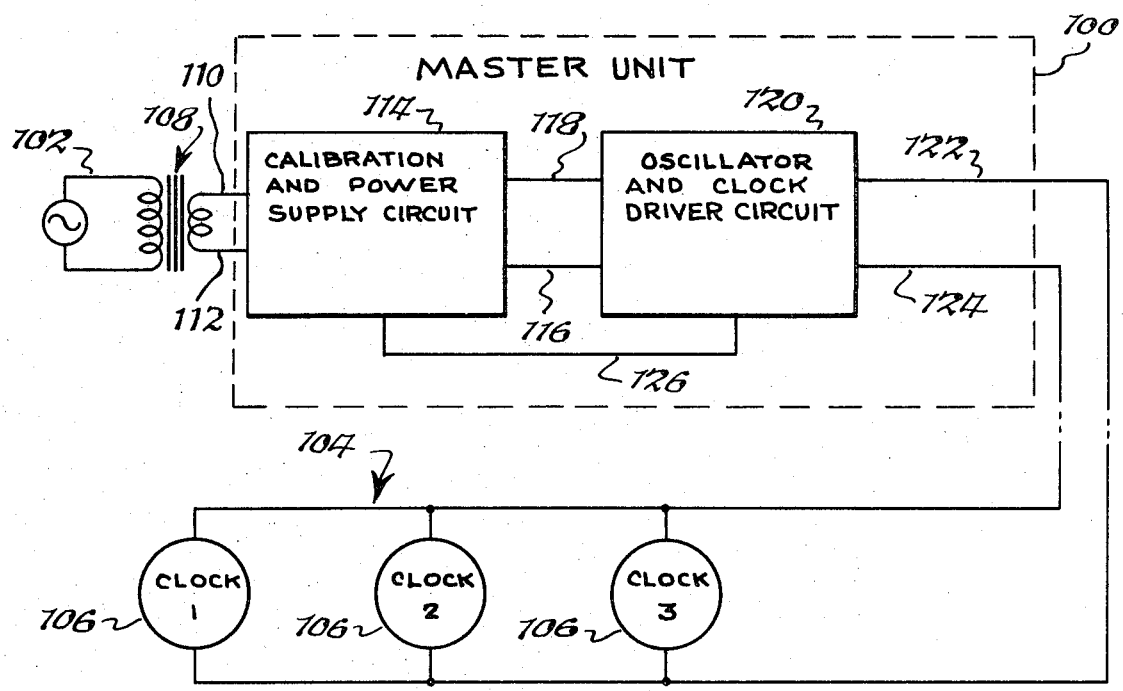
FIG. 1 is a schematic representation of one embodiment of the invention.

Referring now more particularly to FIG. 1, a preferred embodiment of the invention comprises a master timing unit 100 for use with an external source 102 of alternating current. In the illustrated embodiment the external source 102 is a standard 110 volt AC, 60 Hz utility line. However, the voltage and frequency are not critical, and in other embodiments the source of timing intelligence may also be a special purpose utility generator. The master unit 100 powers a clock system 104 comprised of a plurality of secondary clocks 106.

Connected to the external source 102 is a power transformer 108. The transformer 108 reduces the voltage from the source 102 and applies the reduced voltage through lines 110 and 112 to a calibration and supply circuit 114 within the master unit 100. The calibration and supply circuit 114 rectifies the signal from the source 102 and supplies an unregulated DC voltage by leads 116 and 118 to a solid-state oscillator and clock driver 120.

The oscillator and clock driver circuit 120 provides an output signal at leads 122 and 124 which is a series of pulses of alternating polarity. The leads 122 and 124 conduct the oscillator and clock driver output signal to the secondary clock system 104. A feedback lead 126 conducts a signal from the oscillator portion of the circuit 120 to the calibration circuit for purposes of comparing the frequencies of the oscillator and the external source 102. The oscillator circuit may thus be calibrated such that the output signal at leads 122 and 124 will continue at substantially the same frequency during an external power failure.

It is highly advantageous that the master timing unit and secondary clocks of this invention normally be synchronized with the 60 cycles per second alternating line current power available from local utility companies. Virtually all the major utility companies in the United States are members of a nationwide power network whose frequency is maintained at 60 Hz with a tolerance of ± 0.2 Hz on an instantaneous basis and a maximum accumulated error of ± 0.25 cycles in 24 hours. This network customarily holds any accumulated drift of the network frequency within these fixed limits by comparing the frequency with time signals from the Bureau of Standards in Washington, D.C. Thus the clock system of the invention is synchronized with a highly accurate source of timing intelligence during periods of normal operation and may be recalibrated with this accurate timing source after a period of external power failure.

Figure 2:
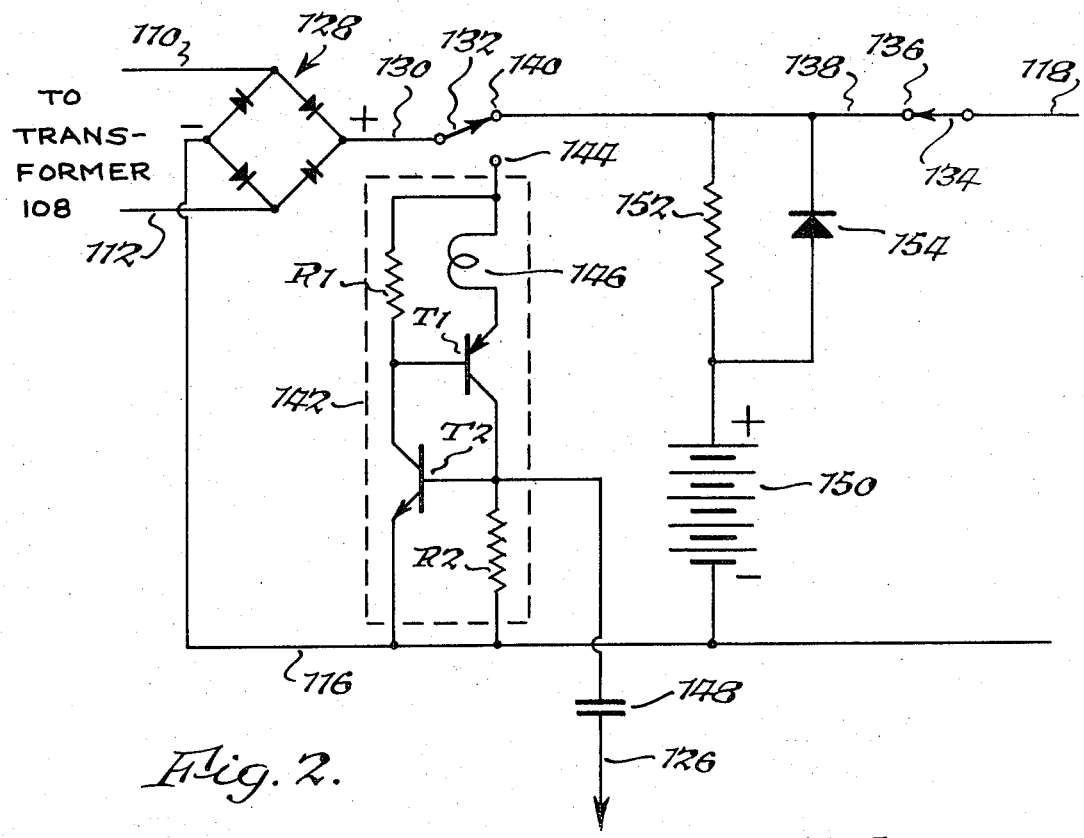
FIG. 2 is a schematic representation of the calibration and power supply circuit of the embodiment of FIG. 1.

Referring now to FIG. 2, the calibration and power supply circuit 114 is schematically represented in greater detail. The voltage from the external source 102 which is reduced by the transformer 108 is applied through the leads 110 and 112 to opposite sides of a full wave, diode rectifier circuit 128. The output of the rectifier circuit 128 consists of a series of unipolar half wave pulses having twice the frequency of the external signal source, namely, approximately 120 pulses per second.

The positive terminal of the bridge 128 is connected through lead 130 to a contact arm 132 of a single pole, double throw switch. The negative terminal of the bridge 128 is connected to the lead 116. The lead 118 is connected at one end to a contact arm 134 of a single pole, single throw switch. The terminal 136 contacted by the arm 134 is connected to one end of a lead 138. The other end of the lead 138 is connected to a terminal 140 which is one of the terminals contacted by the switch arm 132. A calibration circuit 142 is connected between the lead 116 and a terminal 144 which is the other terminal contacted by the switch arm 132. Calibration is initiated by closing the switch arm 132 to contact the terminal 144.

The calibration circuit 142 allows the output of the oscillator portion of the circuit 120 to be synchronized with the signal from the external alternating current source 102. The calibration circuit 142 includes transistors T1 and T2 and resistors R1 and R2 arranged in a PNP-NPN positive feedback configuration to drive a lamp 146. Feedback signals from the oscillator portion of the circuit 120 in the form of positive going spikes are fed through the lead 126 and a capacitor 148 to the calibration circuit 142.

As long as the signal applied through the switch arm 132 to the terminal 144 from the bridge circuit 128 exceeds a predetermined voltage when a positive spike is applied to the calibration circuit through the lead 126, the lamp 146 will remain lighted. When the output from the oscillator portion of the circuit 120 is synchronized with the external alternating current source 102, the spikes on the lead 126 will be coincident in time with the one hundred and twenty half wave pulses per second supplied at the output of the bridge circuit 128. The intensity of the lamp will then appear to remain constant.

If the frequency of the spikes supplied from the oscillator circuit either lags or leads the frequency of the output from the bridge 128, and hence lags or leads a multiple of the frequency of the alternating current source 102, then the spikes will eventually be non-coincident with the half wave pulses from the bridge circuit 128 and the lamp will dim until it is extinguished.

As will be explained below in reference to the description of the oscillator and clock driver circuit 120 shown in greater detail in FIG. 3 the oscillator may be adjusted to synchronize the pulses on the lead 126 with the output from the bridge circuit 128. Although transistors T1 and T2 and resistors R1 and R2 are utilized in the calibration circuit 142 in other embodiments they are replaced by a silicon controlled rectifier circuit.

An auxiliary source of direct current for use during interruptions of power from the external source of alternating current 102 is provided in the form of a battery 150 in series with a resistor 152 between the leads 138 and 116. During periods of normal operation the battery 150 is trickle-charged through the resistor 152. When power from the external source 102 is interrupted, DC current is supplied from the battery 150 through a diode 154 connected in parallel with the resistor 152 such that positive current may flow from the battery anode through the diode 154 to the lead 138. When it is necessary to stop the running of the clocks 106, such as when going from daylight savings time to standard time, the contact arm 134 is opened.

Figure 3:
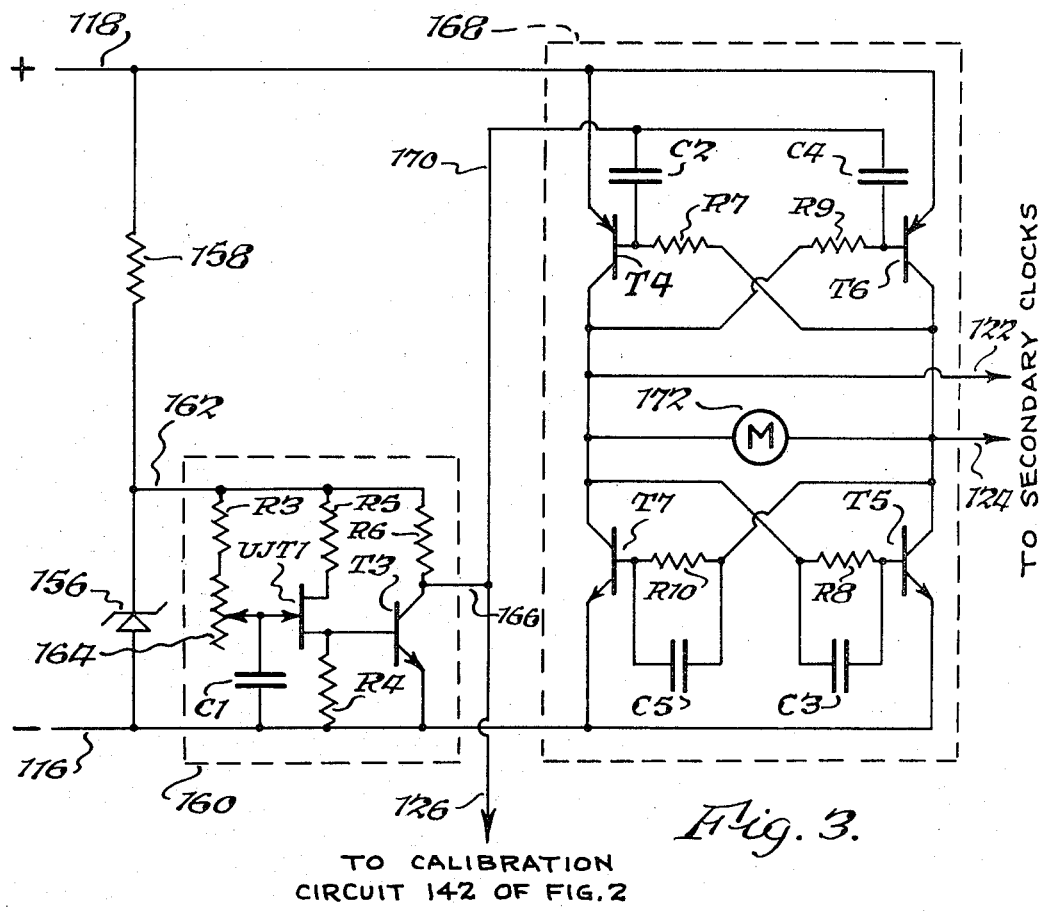
FIG. 3 is a schematic representation of the oscillator circuit of the embodiment of FIG. 1.

Referring now more particularly to FIG. 3 the oscillator and clock driver circuit 120 is shown in greater detail. A zener diode 156 has an anode terminal connected to the lead 116 and a cathode terminal connected to one end of a resistor 158. The opposite end of the resistor 158 is connected to the lead 118. The breakdown voltage of the zener diode 156 is less than the voltage between the leads 116 and 118. Thus the zener diode 156 and the resistor 158 form a regulated voltage divider network.

A relaxation oscillator 160 is connected in parallel with the zener diode 156 between the lead 116 and the cathode terminal of the zener diode. The input lead 162 of the oscillator 160 is connected to the cathode terminal of the zener diode. The oscillator 160 is comprised of resistors R3, R4, R5, and R6 together with transistor T3 and unijunction transistor UJT1 and capacitor C1 to form a relaxation oscillator. A rheostat 164 connected in series with the resistor R3 between the lead 162 and the emitter of the transistor UJT1 allows the frequency of the relaxation oscillator to be adjusted. The oscillator output from the collector of the transistor T3 appears at lead 166. The feedback lead 126 is connected to lead 166.

The oscillator is calibrated while power is being supplied from the external source 102 by closing the switch arm 132 with the contact 144 thereby connecting the calibration circuit 142 with the regulated voltage from the rectifier bridge 128. The oscillator 160 is then powered by the battery 150. The oscillator produces a series of 120 positive going spikes per second at lead 166. These spikes are fed through lead 126 and the capacitor 148 to the calibration circuit 142 as discussed above. By adjusting the rheostat 164, the frequency of the oscillator output may be varied and the output spikes from the oscillator may be made coincident with the half wave pulses available from the rectifier 128.

This adjustment effectively calibrates the oscillator frequency with a multiple of the frequency of the accurate timing signal from the external source 102. The switch arm 132 is then returned to close with the contact 140 and the oscillator 160 continues during normal operation to be synchronized with the external alternating current source 102 because of the unfiltered AC ripple which appears across the leads 118 and 116.

When it is necessary to advance the clocks 106, such as when changing from standard to daylight time, the switch arm 132 is closed with the contact 144 and the rheostat 164 is adjusted to make the oscillator have a frequency greater than 120 pulses per second. The clocks 106 will then run faster than normal. The switch arm 132 is returned to close with the contact 140 and the rheostat 164 is adjusted to recalibrate the oscillator 160 with the external source 102 when the clocks 106 are sufficiently advanced.

A clock driver circuit 168 is connected between the leads 116 and 118. The clock driver circuit 168 is comprised of transistors T4, T5, T6, and T7, resistors R7, R8, R9, and R10, and capacitors C2, C3, C4, and C5 to form a basic flip-flop driver network. An output lead 170 connects the driver circuit 168 with the oscillator output lead 166.

The emitters of the transistors T4 and T6 are connected to the lead 118 while the collector of the PNP transistor T4 is connected to the collector of the NPN transistor T7. The emitter of the NPN transistor T7 and the emitter of the NPN transistor T5 are both connected to the lead 116. The collector of the PNP transistor T6 is connected to the collector of the NPN transistor T5. The resistor R7 is connected between the base of the transistor T4 and the collector of the transistor T6. The capacitor C2 is connected between the base of the transistor T4 and the input lead 170.

The resistor R9 is connected between the base of the transistor T6 and the collector of the transistor T4. The capacitor C4 is connected between the base of the transistor T6 and the input lead 170. The resistor R8 and the capacitor C3 are connected in parallel between the base of the transistor T5 and the collector of the transistor T7. The resistor R10 and the capacitor C5 are connected parallel between the base of the transistor T7 and the collector of the transistor T5.

A synchronous, clock motor 172 is connected between the collectors of the transistors T4 and T6. The lead 122 is connected to the collector of the transistor T4 and the lead 124 is connected to the collector of the transistor T6. The motor 172 is intended to exemplify a synchronous motor of one of the clocks 106 and may or may not operate a time indicating device within the master unit 100.

In operation the transistors T4 and T5 and the transistors T6 and T7, respectively, operate in pairs such that with each positive pulse applied to the lead 170 from the oscillator 160 the transistor pairs are either in a conducting ("on") state or a non-conducting ("off") state. By way of example, assuming that the transistors T4 and T5 are off and the transistors T6 and T7 are on when a positive going spike from the oscillator 160 appears on lead 170, the transistors T4 and T5 will switch on and thereby turn the transistors T6 and T7 off.

Power then flows from the lead 118 through the transistor T4, the motor lead connected to the collector of the transistor T4, the motor 172, the motor lead connected to the collector of the transistor T5, and through the transistor T5 to the lead 116.

The next positive going spike applied to the input lead 170 reverses the operation and turns on the transistors T6 and T7 while turning the transistors T4 and T5 off. Power is then applied from the lead 118 through the transistor T6, the motor 172, and the transistor T7 to the lead 116. Power thus applied to the motor 172 is simultaneously applied to the clock motors of the other clocks 106 through the leads 122 and 124 which effectively couple the remaining clock motors in parallel with the motor 172.

From the foregoing description it is apparent that although the output of the oscillator 160 is one hundred and twenty positive going spikes per second, the flip-flop driver circuit 168 goes through a complete cycle only 60 times per second. The wave shape of the power applied to the motor 172 approximates a square wave having a frequency of substantially 60 cycles per second.

Figure 4:
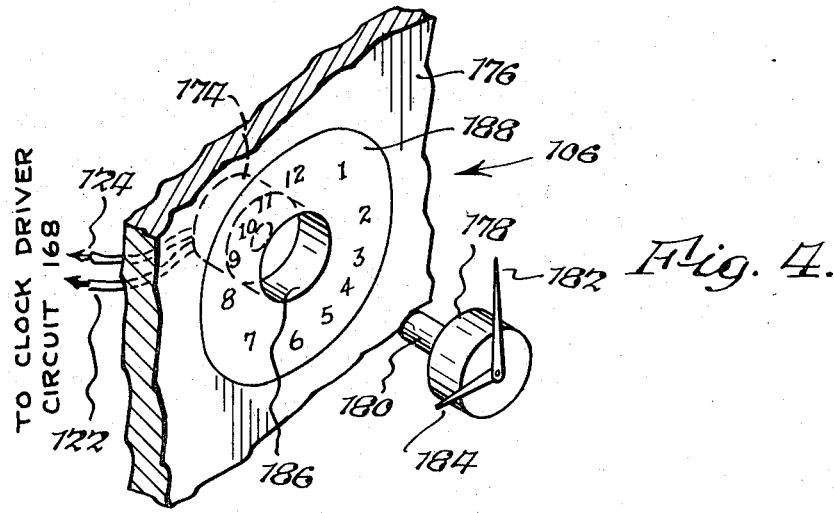
FIG. 4 is a perspective exploded view of one of the clocks of the embodiment of FIG. 1 together with a portion of a wall wherein the clock is mounted.

Referring now more particularly to FIG. 4 one embodiment of a secondary clock 106 shown as comprising a doughnut-shaped stator assembly 174 embedded in a wall 176. The rotor and reduction gears are housed in a casing 178. The rotor itself is mounted within a closed-ended, cylindrical projection 180 of the motor casing 178. At the end of motor casing 178 opposite the projection 180, time indicating hands 182 and 184 are mounted upon concentric shafts which are coupled through reduction gearing within the casing 178 to the rotor.

The entire rotor and gear assembly 178 may be removably inserted through a hole 186 in the wall 176 so that the rotor projection 180 is seated within the hole in the stator assembly 174. The rotor within the projection 180 when so seated is subjected to the magnetic field produced in the stator assembly 174 by pulses delivered to the stator assembly from the clock driver circuit 168 through the leads 122 and 124. A clock face 188 may be painted directly on the wall or affixed by decal or other means.

Together the rotor assembly 178 and the stator assembly 174 comprise a synchronous motor of the type disclosed in U.S. Pat. No. 3,495,113 issued to Arthur W. Haydon on Feb. 10, 1970. Such a motor has a permanent magnet rotor whose axial length exceeds its diameter. The motor is described more fully in the above patent. It is extremely efficient and requires only one watt of alternating current to begin operation and when started continues to run on one-fourth watt or even less.

Because of this efficiency, during a power failure the voltage supplied by the battery 150 to the oscillator circuit 160 and the driver circuit 168 is such that the output voltage at the leads 122 and 124 is less than during normal operation. While this reduced voltage is sufficient to continue the operation of clock motors already running, it is insufficient to re-start individual clock motors which have stopped for some reason. Such stopped individual clocks must be individually reset when power is resumed. The motors are extremely reliable, however, and it would be rare for an individual clock motor to stop. A further advantage of the wall mounted embodiment depicted in FIG. 4 and described above is that the only moving parts of the clock motor are easily accessable for resetting, repair or replacement, simply by unplugging the clock motor housing 178 from the wall.

In some situations it is necessary that the clock system run with extreme accuracy during a period of power interruption. For such cases other embodiments omit the adjustable oscillator 160 and the calibrating circuit 142 and have in their place a standby power system having an internal physical timing standard to supply power for the secondary clock motors 106. An appropriate electro-mechanical timing device of this type is disclosed in U.S. application Ser. No. 837,774, Filed June 30, 1969, by Arthur W. Haydon, or a tuning fork or crystal may be used in a conventional manner.

While certain transistors are described above as being of the NPN or PNP type, other embodiments may use transistors of other types with appropriate changes in circuitry. In some embodiments the transistors may be replaced altogether, for example the solid state relaxation oscillator 160 might be comprised of non- semiconductor elements such as a neon bulb, resistors and capacitors.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A clock system for use with an external source having an alternating current of predetermined uniform frequency, comprising time indicators and synchronous motors for operating the time indicators, means for driving the synchronous motors at a first predetermined power level from said external source, and auxiliary means for maintaining operation of the synchronous motors during interruptions of the external alternating current at a second predetermined power level substantially less than the first predetermined power level, said auxiliary means including a battery and electronic driving means for applying output signal pulses of alternating polarity to the motors at a frequency which is substantially the same as the frequency of the external source.

2. A clock system for use with an external source having an alternating current of predetermined uniform frequency, comprising time indicators and synchronous motors for operating the time indicators, means for driving the synchronous motors at a first predetermined power level from said external source, auxiliary means for maintaining operation of the synchronous motors during interruptions of the external alternating current at a second predetermined power level substantially less than the first predetermined power level, said auxiliary means including a battery and electronic driving means for applying output signal pulses of alternating polarity to the motors at a frequency which is substantially the same as the frequency of the external source, an oscillator for producing unipolar output signal pulses, means to input the oscillator output signal to the driving means, full wave rectifying means responsive to the external alternating current source signal for producing an output signal of unipolar half wave pulses with twice the frequency of the external source to power the oscillator and driving means, and calibrating means including a lamp and means responsive to both the oscillator output signal and the full wave rectifying means output signal for lighting the lamp so long as the pulses of the oscillator output signal are coincident in time with the half wave pulses of the rectifying means output.

3. A clock system for use with an external source having an alternating current of predetermined uniform frequency, comprising time indicators and synchronous motors for operating the time indicators, means for driving the synchronous motors at a first predetermined power level from said external source, and auxiliary means for maintaining operation of the synchronous motors during interruptions of the external alternating current at a second predetermined power level substantially less than the first predetermined power level, said auxiliary means including a battery and electronic driving means for applying output signal pulses of alternating polarity to the motors at a frequency which is substantially the same as the frequency of the external source, at least one of the time indicators including a clock mounted in a wall and driven by the time indicator motor, the motor having a doughnut-shaped stator assembly embedded in the wall and a housing for the rotor dimensioned such that a portion of the housing may be removably inserted into the stator assembly.

4. A clock for use with an external power line source having an alternating current signal of predetermined uniform frequency, the clock comprising an electronic driving means for producing output pulses of alternating polarity at a predetermined frequency, means electrically connected to the power line source for synchronizing the frequency of the output signals of the driving means with the frequency of the external alternating current signal, a clock responsive to the driving means output, the clock including a time indicator and a synchronous motor having a permanent magnet rotor for operating the time indicator, and a source of direct current to power the driving means during interruptions of the external alternating current signal, the direct current source including a rechargable battery and means responsive to the external alternating current signal for charging the battery.

5. A clock for use with an external power line source having an alternating current signal of predetermined uniform frequency comprising a time indicator and a synchronous motor having a permanent magnet rotor for operating the time indicator, electronic driving means for producing output pulses of alternating polarity at a first predetermined power level and a predetermined frequency for driving the time indicator motor, means electrically connected to the power line source for synchronizing the frequency of the output signals of the driving means with the frequency of the external alternating current signal, and a source of direct current power for the driving means to produce output pulses at a second predetermined power level substantially less than the first predetermined power level during interruptions of the external alternating current signal, the direct current source including a rechargable battery and means responsive to the external alternating current signal for charging the battery.

6. A clock for use with an external source having an alternating current signal of predetermined uniform frequency comprising an electronic driving means for producing output signal pulses of alternating polarity at a frequency which is substantially the same as the frequency of the external source signal, the driving means including an oscillator for producing unipolar output signal pulses and a bistable device responsive to the oscillator output signal for producing the driving means output signal, means for synchronizing and calibrating the frequency of the driving means output signal with the frequency of the external source signal, time indicating means responsive to the driving means output signal, the time indicating means including a synchronous motor having a permanent magnet rotor for operating the time indicating means, and a source of direct current to power the driving means during interruption of the external source signal, the direct current source including a rechargable battery and means responsive to the external source signal for charging the battery.

7. A clock as recited in claim 6 further comprising a plurality of time indicating means responsive to the driving means output signal.

8. A clock system for use with an external source having an alternating current signal of predetermined uniform frequency comprising a solid state oscillator for producing a first output signal of unipolar pulses, a solid state bistable driving means responsive to the first output signal for producing a second output signal of pulses of alternating polarity with a predetermined frequency, a plurality of time indicators responsive to the second output signal, each time indicator including a synchronous motor having a permanent magnet rotor for operating the time indicator, means for calibrating the oscillator and synchronizing the frequency of the first output signal with a multiple of the frequency of the external source signal, and a source of direct current to power the oscillator and the driving means during interruption of the external source signal, direct current source including a rechargable battery and means responsive to the external source signal for charging the battery.

9. A clock system as recited in claim 8 wherein the time indicators are powered by the second output signal from the driving means at a first predetermined power level during normal operation of the clock system from the external source and are powered by the second output signal from the driving means at a second predetermined power level substantially less than the first predetermined power level during operation of the clock system from the source of direct current.

* * * * *